US012730803B1

(12) United States Patent
Eberhardt et al.

(10) Patent No.: US 12,730,803 B1
(45) Date of Patent: Sep. 8, 2026

(54) ENTITY-BASED DATA QUERY SYSTEM

(71) Applicant: Samsara Inc., San Francisco, CA (US)

(72) Inventors: Sven Eberhardt, Seattle, WA (US); Haiying Lu, Issaquah, WA (US); Yangyong Zhang, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 19/203,341

(22) Filed: May 9, 2025

(51) Int. Cl.
*G06F 16/242* (2019.01)
*G06F 16/21* (2019.01)

(52) U.S. Cl.
CPC .......... *G06F 16/243* (2019.01); *G06F 16/211* (2019.01)

(58) Field of Classification Search
CPC ............................ G06F 16/243; G06F 16/211
See application file for complete search history.

(56) References Cited

U.S. PATENT DOCUMENTS 11,113,269 B1* 9/2021 Andrade Garcia ... G06F 16/211
2009/0254514 A1* 10/2009 Adair ...................... G06F 16/22
2013/0080472 A1* 3/2013 Cohen .................. G06F 16/243 707/E17.128
2017/0308573 A1* 10/2017 Brisebois .......... G06F 16/24535
2022/0179868 A1* 6/2022 Mortazavi ........... G06F 16/2379
2024/0394251 A1* 11/2024 Brende ............... G06F 11/3409
2025/0068885 A1* 2/2025 Poupyrev ............ G06F 16/3329
2025/0147957 A1* 5/2025 Verkruyse ......... G06F 16/24522
2025/0190604 A1* 6/2025 Fu ......................... G06F 16/242
2025/0200027 A1* 6/2025 Fu ...................... G06F 16/24522

* cited by examiner

*Primary Examiner* — Sonia L Gay
(74) *Attorney, Agent, or Firm* — Schwegman Lundberg & Woessner, P.A.

(57) ABSTRACT

Systems and methods are provided for processing natural language queries using an entity-based data query system. The system maintains a plurality of entities in an entity registry, where each entity corresponds to a data type and includes query fragments and entity attributes. Upon receiving a natural language query, the system analyzes it using a large language model (LLM) to identify referenced entities and retrieves corresponding entity information. The system constructs and executes data retrieval operations based on query fragments, providing results and entity attributes to the LLM for response generation. The system utilizes planning prompts and entity prompts to guide query processing and reduce hallucinations. Entity attributes may include retriever functions, data schemas, field mappings, and transformation rules. The system supports hierarchical entity organization and enables iterative query refinement through an interactive interface.

18 Claims, 10 Drawing Sheets

ANALYZING THE RESULT DATA USING THE LLM
402

DETERMINING THAT ADDITIONAL DATA IS NEEDED TO RESPOND TO THE NATURAL LANGUAGE QUERY
404

IDENTIFYING ADDITIONAL DATA ENTITIES
406

RETRIEIVING ADDITIONAL RESULT DATA BASED ON THE ADDITIONAL DATA ENTITIES
408

ENTITY-BASED DATA QUERY SYSTEM

TECHNICAL FIELD

Embodiments of the present invention relate to natural language processing systems for querying structured data sources. More specifically, it pertains to systems and methods for retrieving and processing data from multiple data sources using large language models to interpret natural language queries and generate appropriate data retrieval operations.

BACKGROUND

Natural language processing systems for querying structured data sources have become increasingly important as organizations seek to make their data more accessible to users without specialized technical knowledge. Large Language Models (LLMs) have emerged as powerful tools for interpreting natural language requests and generating appropriate queries for structured data sources such as SQL and GraphQL databases.

Despite their capabilities, current approaches to using LLMs for data querying face significant technical challenges. When dealing with complex data environments involving numerous tables and requiring multiple joins, the prompts necessary to guide these models become unwieldy, resulting in increased computational costs and reduced efficiency.

A particularly troublesome issue is the occurrence of hallucinations-instances where LLMs generate incorrect or fabricated information. These hallucinations become more prevalent when LLMs are tasked with creating complex queries, especially in scenarios where domain-specific knowledge is essential for accurate query formulation.

Additionally, developers often struggle to maintain adequate control over the queries generated by LLMs. This lack of control can lead to inefficient, slow, or simply incorrect queries, particularly in contexts requiring specialized domain knowledge.

When LLMs are provided with extensive context information, such as comprehensive data schemas spanning multiple tables, they tend to mix up pieces of information from different parts of the context. This confusion between contextual elements contributes significantly to the hallucination problem, as the model's reasoning about one part of the data can be disturbed by information from another part.

Furthermore, as data environments grow in complexity and scale, these systems often fail to maintain their effectiveness. The demonstrations that appear successful with simple data structures frequently break down when confronted with larger datasets, ambiguous data, or information sourced from multiple interconnected systems that require sophisticated reasoning to determine what data to retrieve.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
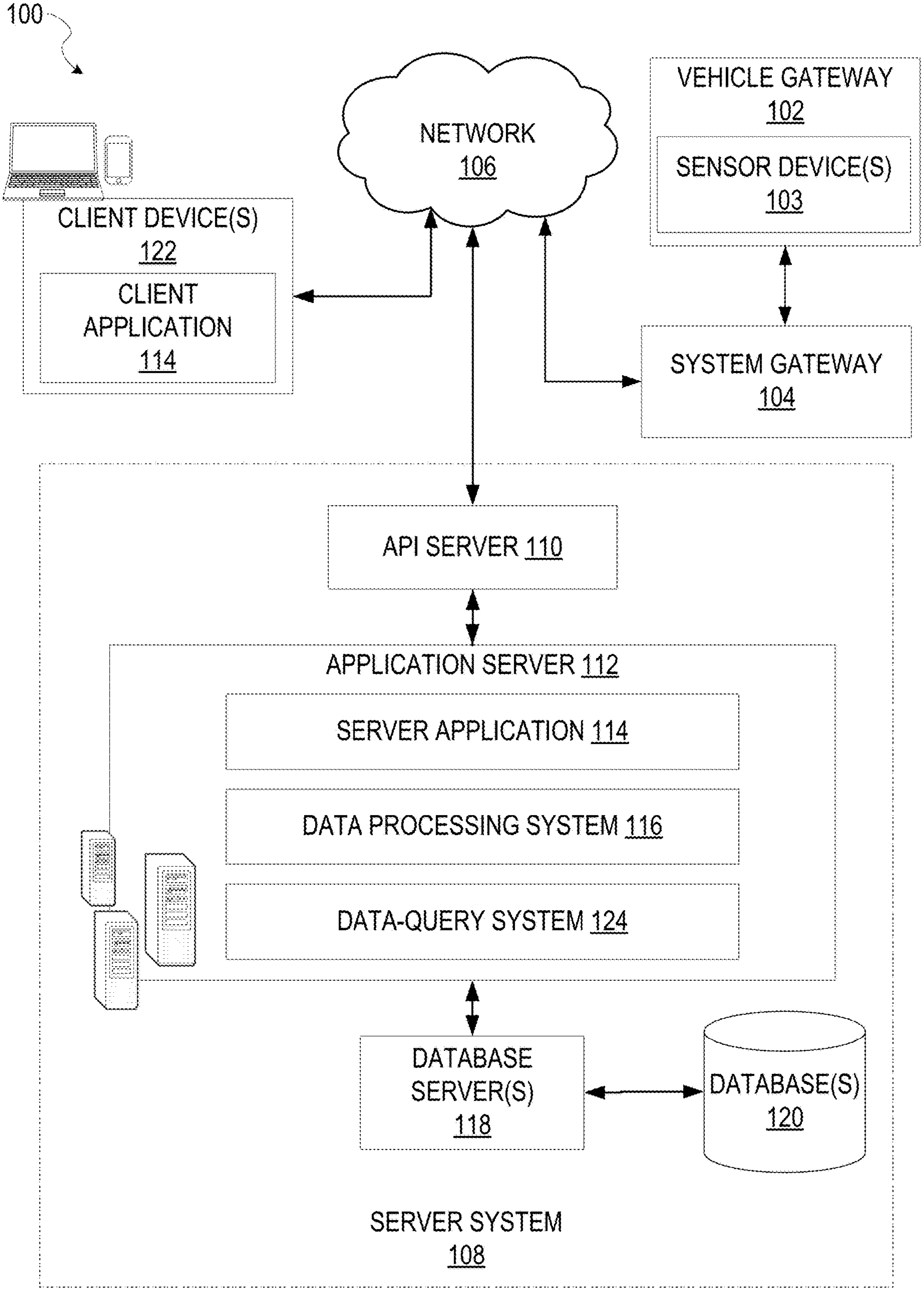
FIG. 1 is a block diagram showing an example system for entity-based data querying, according to certain example examples.

Natural language processing systems for querying structured data sources have become increasingly important as organizations seek to make their data more accessible to users without specialized technical knowledge. Large Language Models (LLMs) have emerged as powerful tools for interpreting natural language requests and generating appropriate queries for structured data sources such as SQL and GraphQL databases.

Despite their capabilities, current approaches to using LLMs for data querying face significant technical challenges. When dealing with complex data environments involving numerous tables and requiring multiple joins, the prompts necessary to guide these models become unwieldy, resulting in increased computational costs and reduced efficiency. A particularly troublesome issue is the occurrence of hallucinations-instances where LLMs generate incorrect or fabricated information. These hallucinations become more prevalent when LLMs are tasked with creating complex queries, especially in scenarios where domain-specific knowledge is essential for accurate query formulation.

When LLMs are provided with extensive context information, such as comprehensive data schemas spanning multiple tables, they tend to mix up pieces of information from different parts of the context. This confusion between contextual elements contributes significantly to the hallucination problem, as the model's reasoning about one part of the data can be disturbed by information from another part. Additionally, developers often struggle to maintain adequate control over the queries generated by LLMs. This lack of control can lead to inefficient, slow, or simply incorrect queries, particularly in contexts requiring specialized domain knowledge.

Furthermore, as data environments grow in complexity and scale, these systems often fail to maintain their effectiveness. The demonstrations that appear successful with simple data structures frequently break down when confronted with larger datasets, ambiguous data, or information sourced from multiple interconnected systems that require sophisticated reasoning to determine what data to retrieve.

According to certain examples, the present invention overcomes these problems by using a system of data entities. Each entity may for example correspond with a specific data type and contains entity information including query fragments and entity attributes. This approach allows the system to identify only the specific entities needed for a particular query rather than loading the entire data schema.

In certain examples, the system maintains a plurality of entities in an entity registry, with each entity of the plurality of entities corresponding to a data type and comprising entity information that includes query fragments and entity attributes. When a natural language query is received from a client device, the system uses a large language model to identify which specific entities are referenced in the query. Once the relevant entities are identified, the system retrieves only the entity information associated with those specific entities from the entity registry.

The system may employ various query analysis techniques to identify entities referenced in natural language queries. These techniques can include keyword extraction, parts-of-speech analysis, entity extraction models, and machine learning models. The query interpretation system processes natural language input to determine relevant entities while reducing computational overhead and improving accuracy compared to processing entire data schemas.

After retrieving the entity information, the system constructs a data retrieval operation based on the query fragments associated with the one or more entities. The query fragments define how to access and retrieve data for each specific entity. When multiple entities provide query fragments for the same asset type, they are ranked to execute the most specific one first. For example, if both geosearch and vehicles entities have query functions to retrieve vehicles, the geosearch function would be used as it is more specific, rather than fetching all vehicles and then filtering by location. When constructing data retrieval operations, the system evaluates the specificity and efficiency of available query fragments. For example, when both a general vehicle query and a specialized geosearch query are available, the system prioritizes the more specific geosearch implementation to optimize data retrieval performance.

The system then executes the data retrieval operation against one or more data sources to obtain result data corresponding to the identified specific entities. This operation may involve connecting to databases, APIs, or other data sources as specified in the entity information.

According to certain examples, once the result data is obtained, the system provides both the result data and the entity attributes of the one or more entities to the LLM. The entity attributes include contextual information about how to interpret and present the result data. These attributes may comprise retriever functions that define how to fetch data for the entity, GraphQL query fragments for constructing data queries, data schema definitions describing the structure of entity data, field mappings that correlate entity fields with database columns, data transformation rules for processing retrieved data, filter specifications that define valid filtering operations for the entity, aggregation functions for summarizing entity data, join conditions specifying how the entity relates to other entities, and entity relationship definitions specifying hierarchical connections to other entities.

The entity information includes data access specifications that define how to retrieve data through various protocols. While some entities may utilize GraphQL queries, others may implement custom data retrieval methods through third-party APIs, direct database access, or specialized data access protocols. This flexibility enables integration with diverse data sources while maintaining consistent entity-based organization and processing.

The LLM then generates a response to the natural language query based on the result data and guided by the entity attributes. By limiting the provided entity attributes to only those associated with the identified specific entities, the system reduces hallucinations by preventing the LLM from mixing information between unrelated data contexts. The system then receives this response from the LLM and can present it to the user through the client device.

The entities in the system can be organized in a hierarchical structure, allowing the system to retrieve information from a branch of entities in the hierarchical structure when needed. For example, if a user asks about hours of service (HOS) status, which is a child entity of the driver entity, the system would retrieve information from both the HOS entity and its parent driver entity. This hierarchical organization helps manage complexity while still providing access to all necessary information.

In some examples, entity identification and activation may also be driven by system context, independent of explicit query content. For example, entities may be automatically activated based on the current interface view (such as a safety dashboard), previous interaction history within a chat session, or user-specific context. This contextual activation helps ensure relevant data sources and processing capabilities are readily available without requiring explicit references in the query.

The system also supports an iterative approach to data retrieval. After analyzing the initial result data using the LLM, the system can determine that additional data is needed to respond to the natural language query, identify additional data entities to query, and retrieve additional result data based on the additional data entities. This allows for more comprehensive responses to complex queries.

In some examples, users can request to add a new entity to the entity registry, and the system will generate entity information for the new entity, including the query fragments and the entity attributes specific to the new entity, and store the new entity in the entity registry. This extensibility enables the system to adapt to various use cases and data structures without requiring extensive reconfiguration. For example, a user can create custom forms that become queryable as entities by simply adding the form entities to the catalogue.

In some examples, the system can also track data freshness by determining a timestamp indicating when data associated with at least one of the entities was last updated, including the timestamp in the entity attributes provided to the LLM, and incorporating an indication of data recency based on the timestamp in the response to the natural language query. This provides users with important context about the timeliness of the information they receive.

FIG. 1 is a block diagram showing an example system 100 for entity-based data querying using large language models, according to certain examples. The system 100 includes one or more client devices 122 that host a number of applications including a client application 114.

Accordingly, each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., natural language queries, entity information, and query results).

The server system 108 provides server-side functionality via the network 106 to a particular client application 114, and in some embodiments to the vehicle gateway 102 and the system gateway 104. While certain functions of the system 100 are described herein as being performed by either a client application 114, the vehicle gateway 102, the system gateway 104, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, or one or more processors of the vehicle gateway 102, or system gateway 104, where there may be sufficient processing capacity.

The server system 108 supports various services and operations that are provided to the client application 114. Such operations include transmitting data to, receiving data from, and processing data generated by the client application 114, the vehicle gateway 102, and the system gateway 104. The vehicle gateway 102 includes sensor devices 103 comprising various sensors configured to collect vehicle and driver data. In some embodiments, this data includes safety scores, fuel efficiency, driver behavior, vehicle location, and other operational metrics. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the vehicle gateway 102 and processed by the application server 112. In some examples, the database 120 may include an entity registry storing a plurality of entities.

Dealing specifically with the API server 110, this server receives and transmits data (e.g., natural language queries, entity information, and query results) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, and the processing of natural language queries.

The application server 112 hosts a number of applications and subsystems, including a server application 114, and a data-query system 124. The data-query system 124 is configured to maintain a plurality of entities in an entity registry, analyze natural language queries to identify referenced entities, retrieve entity information, construct and execute data retrieval operations, and generate responses using a large language model. Further details of the data-query system 124 can be found in FIG. 2 below.

The server application 114 implements a number of data processing technologies and functions, particularly related to the processing of data generated by the sensor devices 103 of the vehicle gateway 102. The data is processed and analyzed before being stored in the entity registry. Other processor and memory intensive processing of data may also be performed server-side by the server application 114, in view of the hardware requirements for such processing.

The application server 112 is communicatively coupled to a database server 118, which facilitates access to a database 120 in which is stored data associated with the plurality of entities and their corresponding entity information, including query fragments and entity attributes.

Figure 2:
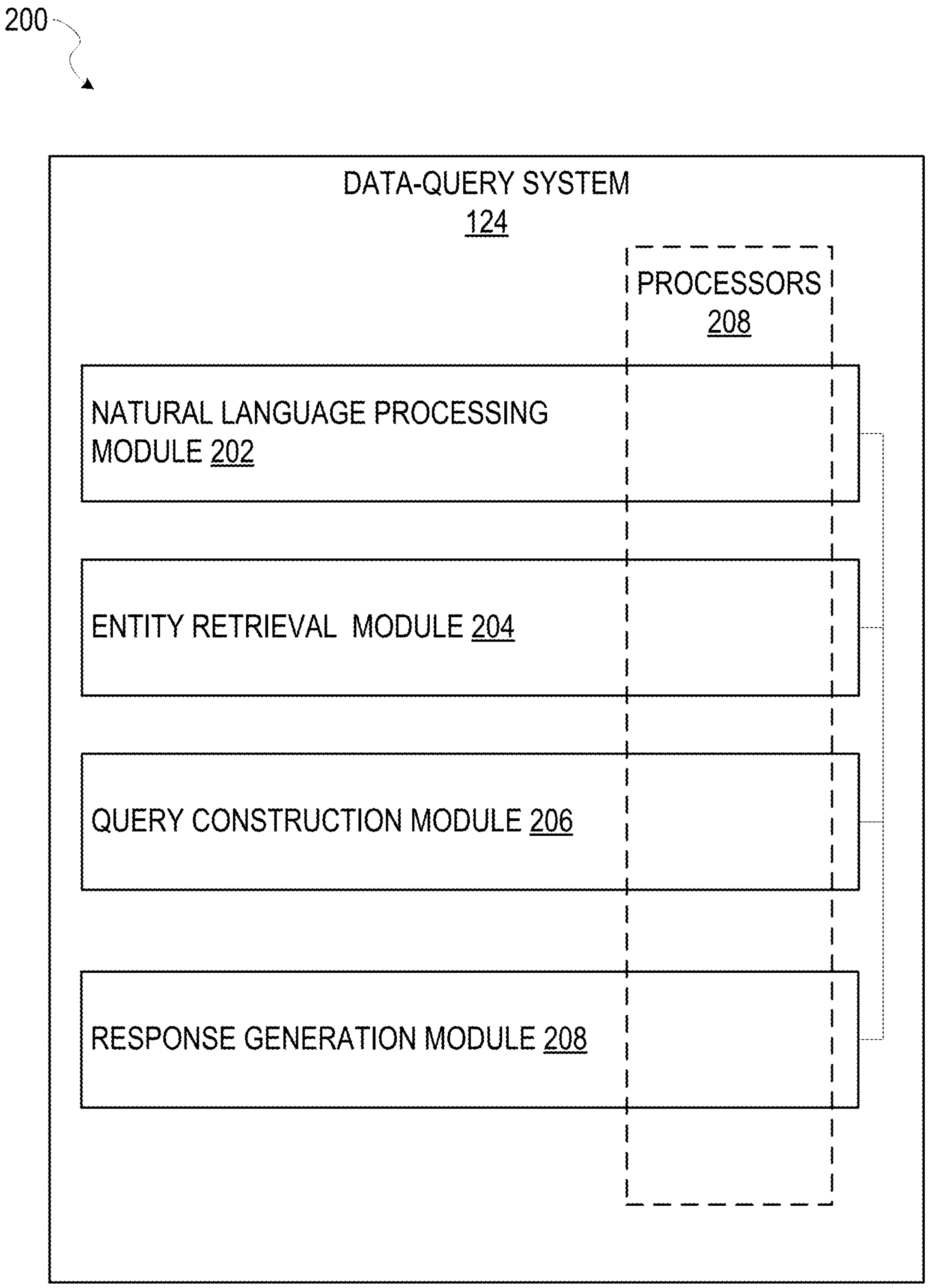
FIG. 2 is a block diagram illustrating components of the data-query system that configure the system to perform operations for entity-based data querying, according to certain examples.

FIG. 2 is a block diagram 200 illustrating components of the data-query system 124 that configure the data-query system 124 to perform operations for entity-based data querying, according to certain examples. The data-query system 124 is shown to include multiple modules configured to perform specialized functions related to processing natural language queries and retrieving data using an entity-based approach.

The natural language processing module 202 is configured to receive natural language queries from client devices and analyze them using various query analysis techniques including keyword extraction, parts-of-speech analysis, entity extraction models, and machine learning models. The module identifies specific entities referenced in the queries based on both query content and system context, including the current interface view, interaction history, and user context. This targeted entity identification helps reduce processing overhead compared to analyzing entire data schemas.

The entity retrieval module 204 retrieves entity information associated with the identified entities from the entity registry. This module accesses only the specific entities needed rather than loading the entire data schema, which helps reduce processing overhead by preventing information mixing between unrelated data contexts. The entity information includes data access specifications that define how to fetch data through various protocols including GraphQL queries, third-party APIs, and custom data retrieval methods.

The query construction module 206 constructs data retrieval operations based on the data access specifications associated with the identified entities. When multiple entities provide data retrieval methods for the same asset type, this module ranks them to execute the highest-ranking method first based on specificity and efficiency.

The response generation module 208 provides the result data and the entity attributes of the identified entities to the query interpretation system and receives responses to the natural language queries. This module can also analyze the result data to determine if additional data is needed, identify additional data entities to query, and retrieve additional result data. The module incorporates entity attributes such as data freshness timestamps and formatting specifications to generate comprehensive and accurate responses.

The processors 208 execute instructions to implement the functionality of the various modules described above. The processors coordinate the flow of data between modules and manage system resources to ensure efficient operation of the data-query system 124. The processors also handle the communication with the query interpretation system for analyzing queries, processing data, and generating responses.

Figure 3:
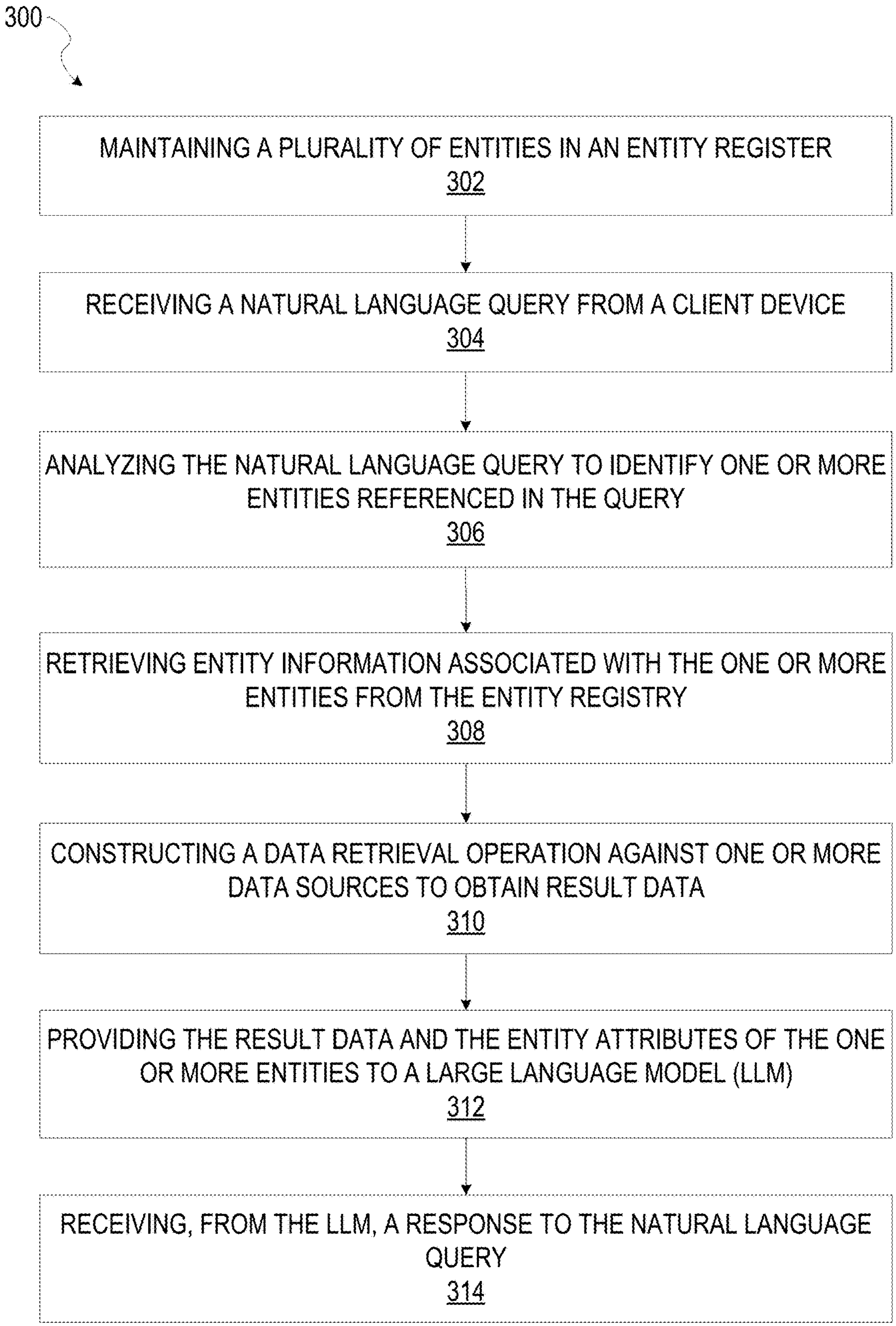
FIG. 3 is a flowchart depicting a method of processing natural language queries using an entity-based approach, according to certain examples.

FIG. 3 is a flowchart 300 depicting a method of processing natural language queries using an entity-based approach, according to certain examples. The method includes operations for maintaining entities in an entity register, analyzing queries to identify referenced entities, and providing result data and entity attributes to a large language model.

At operation 302, the method includes maintaining a plurality of entities in an entity registry within the database 120 of the server system 108. In certain examples, each entity corresponds to a specific data type and contains entity information including query fragments and entity attributes. The entity attributes may include retriever functions that define how to fetch data for the entity, GraphQL query fragments, data schema definitions, and other information that helps interpret and present the data.

At operation 304, the method includes receiving a natural language query from a client device 122 via the network 106. For example, this query might be something like "Find trucks near Chicago sorted by fuel efficiency" or "Why is Aron Ash's safety score so low?" as shown in the example interfaces depicted in FIG. 6.

At operation 306, the method includes analyzing the natural language query using the data-query system 124 to identify one or more entities referenced in the query. In certain examples, this analysis is performed using a large language model (LLM) implemented by the application server 112 that determines which specific entities from the entity registry are relevant to the query.

At operation 308, the method includes retrieving entity information associated with the one or more entities from the entity registry in the database 120. In certain examples, when entities are organized in a hierarchical structure, this operation may involve retrieving information from a branch of entities in the hierarchical structure. For instance, if a user asks about hours of service (HOS) status, which is a child entity of the driver entity, the system would retrieve information from both the HOS entity and its parent driver entity.

At operation 310, the method includes constructing a data retrieval operation against one or more data sources in the database 120 to obtain result data. In certain examples, this involves combining and ranking query fragments from the identified entities, with the system executing the highest-ranking query fragment first when multiple entities provide fragments for the same asset type.

At operation 312, the method includes providing the result data and the entity attributes of the one or more entities to a large language model (LLM) implemented by the server application 114. In certain examples, the entity attributes include contextual information about how to interpret and present the result data, which helps the LLM generate accurate and relevant responses without hallucinations.

At operation 314, the method includes receiving, from the LLM, a response to the natural language query which is then transmitted to the client device 122 via the API server 110 and network 106. In certain examples, this response is generated by the LLM by analyzing the result data according to the guidance provided in the entity attributes associated with the one or more entities. The response may include data recency information, links to dashboards, or other contextual information derived from the entity attributes.

Figure 4:
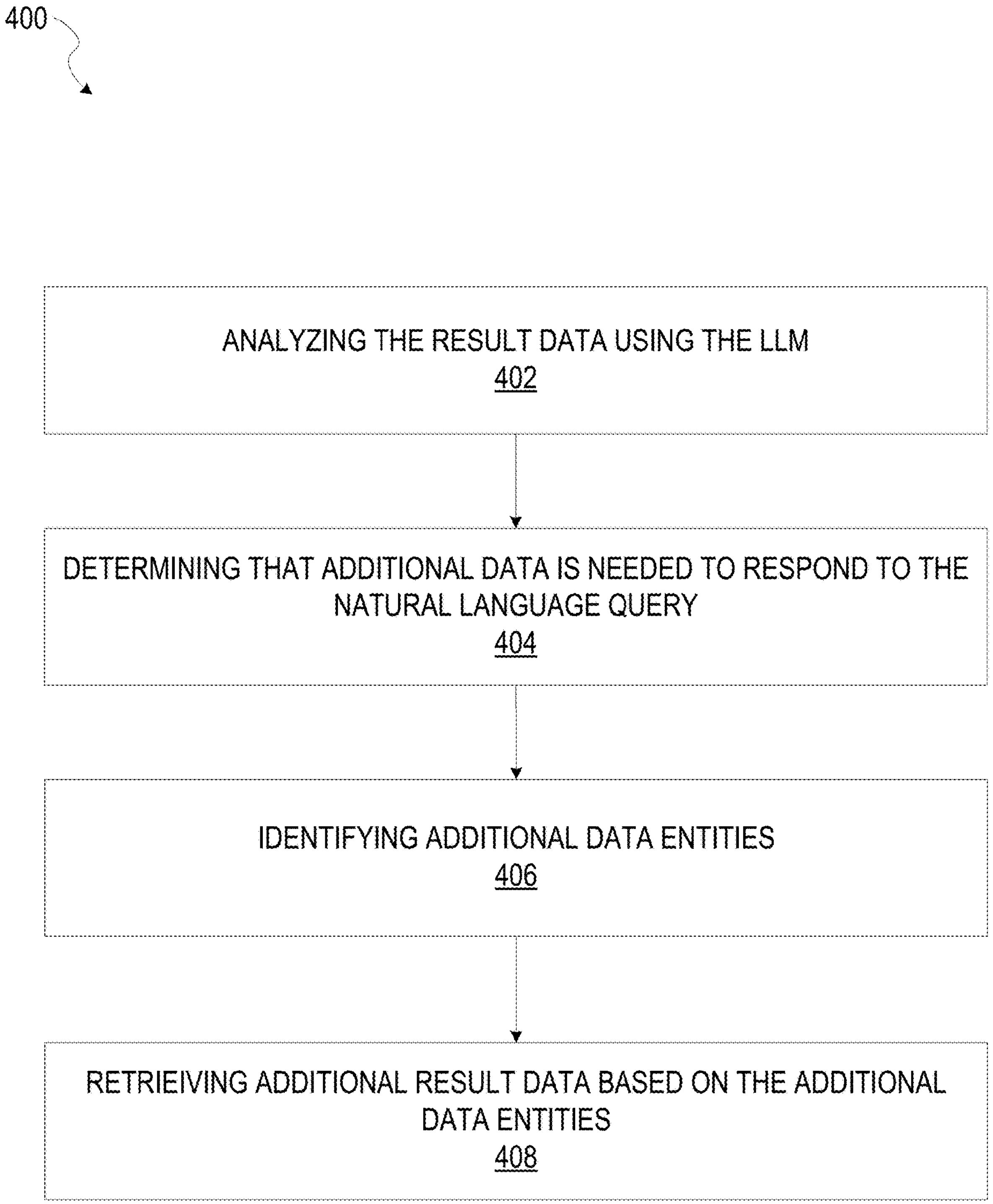
FIG. 4 is a flowchart depicting a method of analyzing result data and retrieving additional information when needed, including determining that additional data is needed, identifying additional data entities, and retrieving additional result data based on those entities, according to certain examples.

FIG. 4 is a flowchart 400 depicting a method of analyzing result data and retrieving additional information when needed, according to certain examples. The method includes operations for determining when additional data is required to fully respond to a natural language query.

At operation 402, the method includes analyzing the result data using the LLM implemented by the server application 114. In certain examples, this analysis involves the LLM examining the initial data retrieved based on the identified entities to determine if it is sufficient to provide a comprehensive response to the user's query.

At operation 404, the method includes determining, based on the analysis, that additional data is needed to respond to the natural language query. In certain examples, this determination is made when the LLM recognizes that the initial data provides only partial information relevant to the query. For example, initial queries may not yield the full result needed, or open-ended questions such as "help me with my safety meeting" may need follow-up queries.

At operation 406, the method includes identifying additional data entities to query using the data-query system 124. In certain examples, this identification is guided by entity relationship definitions and processing plans associated with the initially retrieved entities. For instance, if a user asks about safety scores, the system might first retrieve the safety report entity, but then identify that additional speeding report entities are needed based on the initial analysis.

At operation 408, the method includes retrieving additional result data from the database 120 based on the additional data entities. In certain examples, this retrieval operation follows the same process as the initial data retrieval, constructing and executing data retrieval operations based on query fragments associated with the newly identified entities. This iterative approach allows the system to build more comprehensive responses to complex queries by following the relationships between entities.

Figure 5:
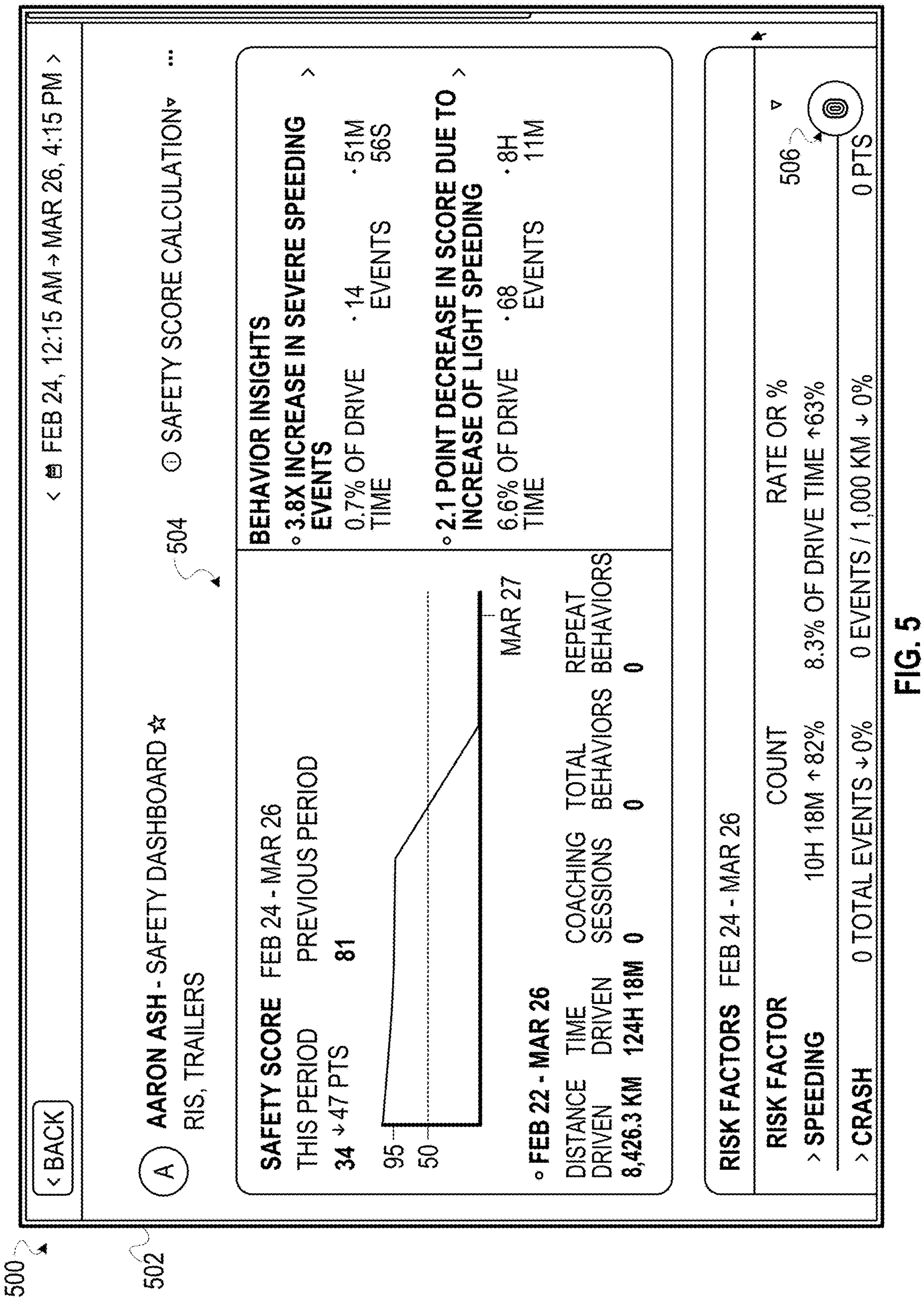
FIG. 5 is an interface diagram illustrating a safety dashboard, according to certain examples.

FIG. 5 is an interface diagram 500 illustrating a safety dashboard 502 for presenting analytics information to a user, according to certain examples. The interface comprises a data visualization section that presents comprehensive analytics 504 including calculations and comparative metrics in an organized visual format. The safety dashboard may in some examples includes a graphical interaction element 506 that, when activated by user selection, initiates communication with the data query system 124.

Figure 6:
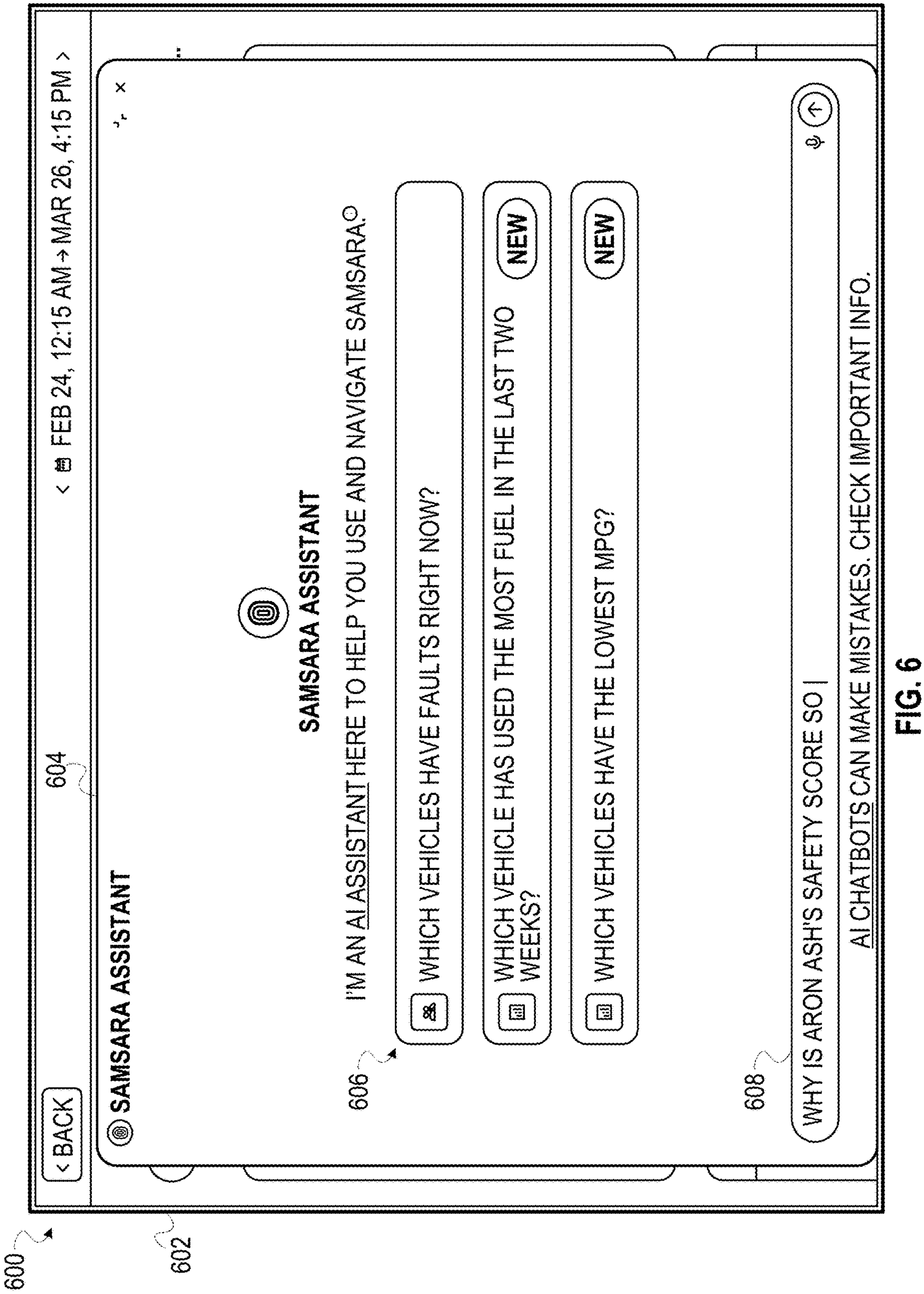
FIG. 6 illustrates an exemplary interface diagram showing a data query interface for interacting with the entity-based query system, according to certain examples.

FIG. 6 illustrates an exemplary interface diagram 600 showing a data query interface 602 for interacting with the data query system, according to certain examples. The data query interface 602 includes a set of suggested queries 606 that are presented to the user to facilitate interaction with the system. These suggested queries may be dynamically generated based on the contents and analytics presented in the safety dashboard interface (i.e., the analytics 504), providing contextually relevant query suggestions to the user.

In some examples, the interface 602 further includes a request field 608 where users can input custom natural language queries to interact with the system. The request field 608 enables users to submit free-form questions about the data, while the suggested queries 606 provide guided entry points for common or relevant inquiries based on the current dashboard context.

Figure 7:
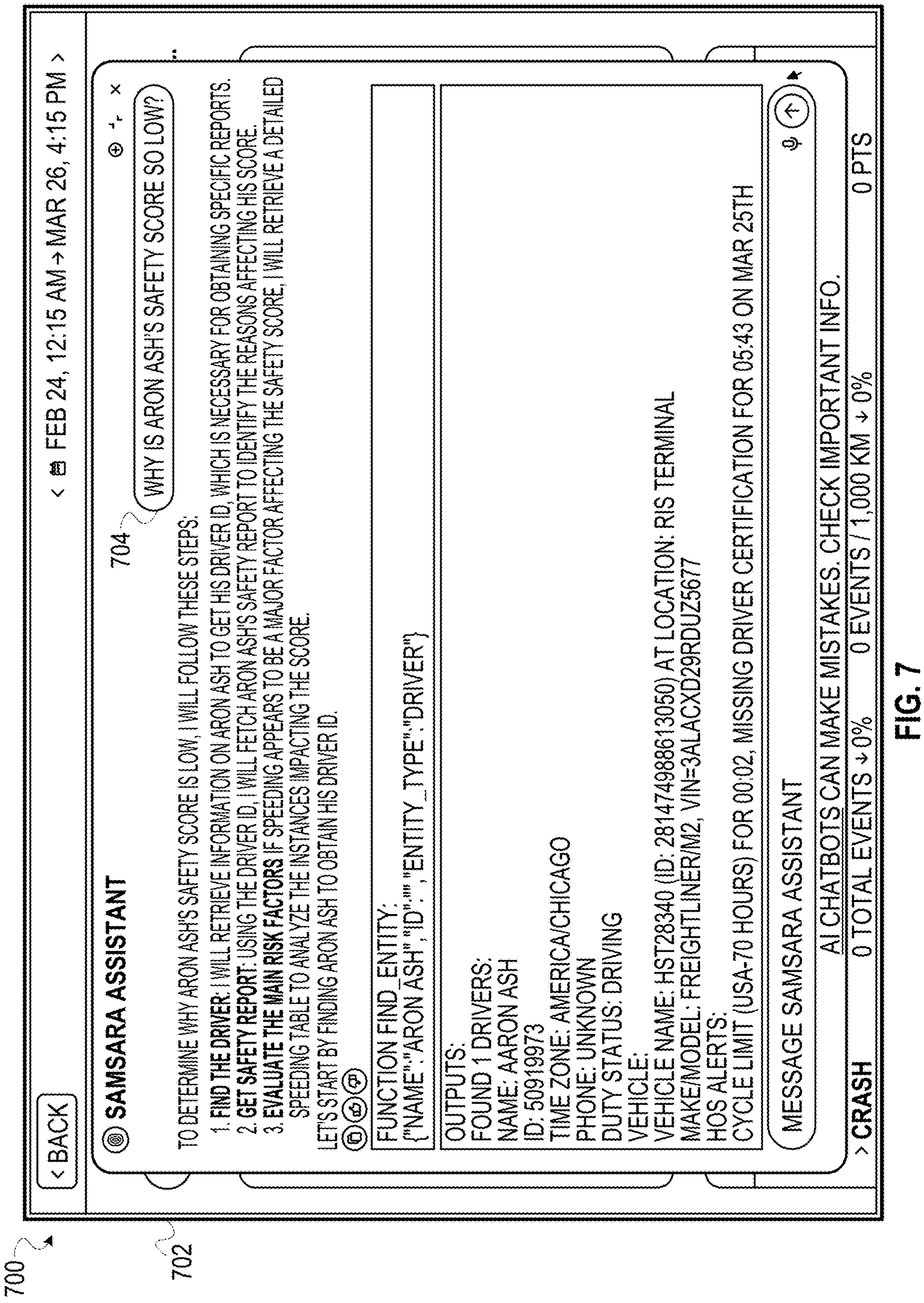
FIG. 7 is an interface diagram illustrating a response to a natural language query, according to certain examples.

FIG. 7 illustrates an exemplary interface diagram 700 showing a data query interface 702 that displays system-generated content in response to user queries. The data query interface 702 presents analytical content generated by the entity-based query system, including detailed information retrieved and processed through the system's entity-based architecture. In some examples, within the data query interface 702, a user request 704 is displayed at a designated position, maintaining context between the user's natural language query and the system's corresponding response.

Figure 8:
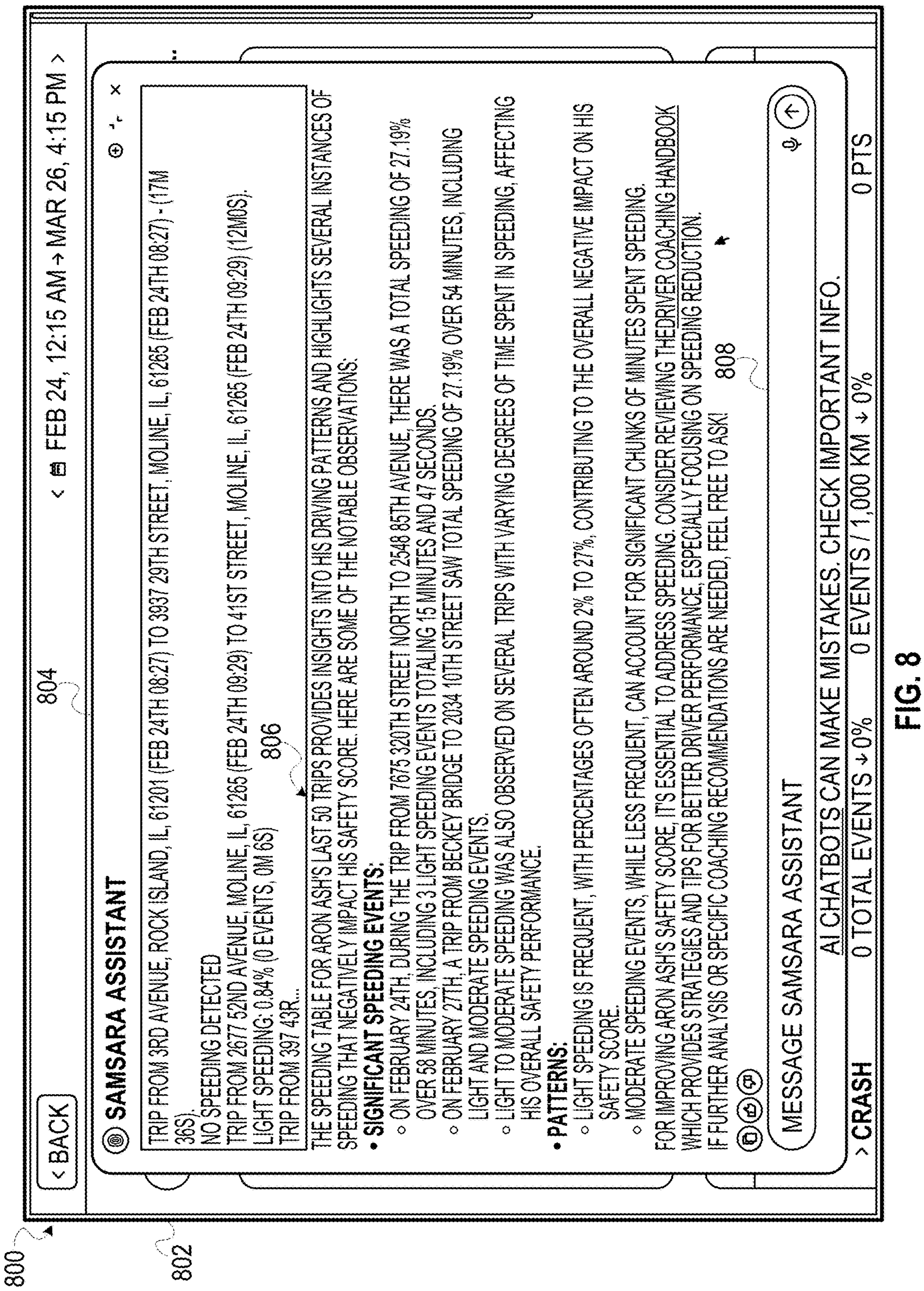
FIG. 8 is an interface diagram illustrating a response to a natural language query, according to certain examples.

FIG. 8 illustrates an exemplary interface diagram 800 showing a data query interface 802 that displays system-generated responses to user queries. The data query interface 802 includes a response section 806 that presents detailed analytical content generated by the entity-based query system in response to the user's request. The response 806 provides comprehensive analysis of the queried data, including detailed breakdowns of relevant metrics and insights derived from the entity-based data structure. In some examples, the interface also includes a request field 808 positioned within the data query interface 802, enabling users to submit additional natural language queries based on the context of their prior request and the system's response.

Figure 9:
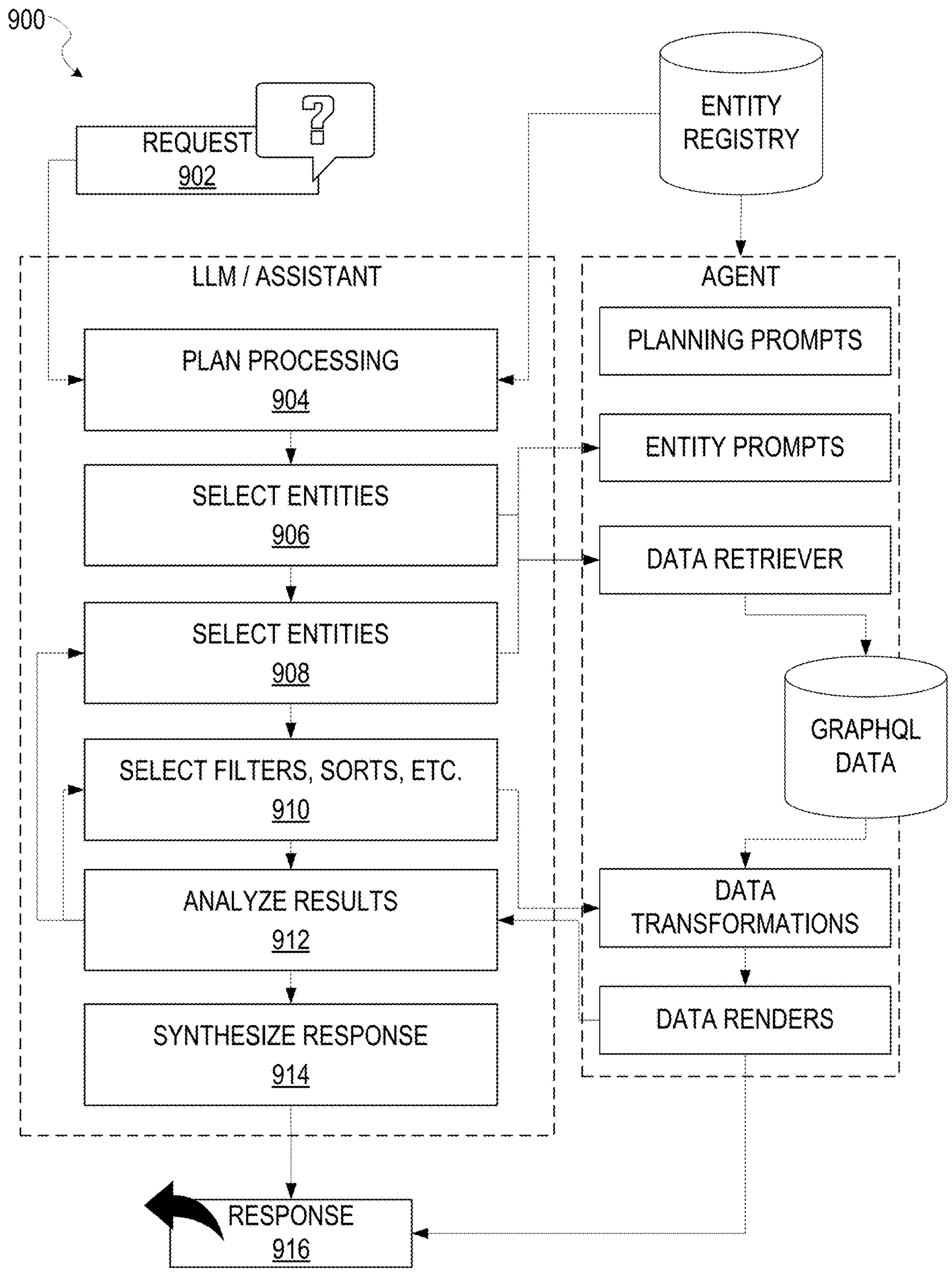
FIG. 9 illustrates a detailed flow diagram of the entity-based data query system showing the processing flow from initial request to final response, according to certain examples

FIG. 9 illustrates a detailed flow diagram 900 of the entity-based data query system showing the processing flow from initial request to final response, according to certain examples. The system receives a request 902 that initiates interaction between the Entity Registry and a query interpretation system.

The system processes the request through plan processing 904, utilizing both planning prompts and entity prompts to construct an execution strategy for handling the natural language query. Planning prompts contain system-defined instructions that provide step-by-step guidance for processing specific query types, such as analyzing safety data by first reviewing safety reports, then identifying key metrics, and providing relevant recommendations. Entity prompts comprise contextual attributes and hints associated with specific entities that guide data processing and interpretation, including information about data freshness, entity relationships, and domain-specific considerations for analyzing entity data. The combination of these prompts enables the system to construct a structured execution strategy by determining query order, identifying necessary data transformations, providing contextual interpretation guidance, and ensuring comprehensive responses that incorporate domain knowledge while maintaining controlled context management.

The system identifies entities at operation 906 based on multiple factors including query content, current interface context, and interaction history. These entities are selected from among a plurality of entities maintained in the entity registry and routed to a data retriever component that supports various data access protocols. Concurrently, the system executes a parallel entity selection process at operation 908 that feeds into operation 910, where the system applies filters, sorting parameters, and additional query specifications based on the identified entity attributes.

The system analyzes results at operation 912, applying data transformations to process and evaluate the retrieved data according to the entity attributes and query parameters. The analysis may determine if additional data entities need to be queried to provide a comprehensive response.

At operation 914, the system synthesizes a response by utilizing data renders to convert the analyzed data into appropriate presentation formats for users. The data renders are formatting components that structure the information based on guidance from two key sources: (1) entity attributes, which contain display specifications and formatting rules specific to each entity type, and (2) planning prompts, which provide context-aware instructions for how to present different types of analytical responses. For example, when presenting safety data, the data renders may format the information according to entity-specific display rules (like "show as X L/100 km") while following planning prompt guidance on presenting comprehensive safety analysis with appropriate contextual details and recommendations. This structured approach ensures consistent and contextually appropriate presentation of query results through the system's interface.

The system generates the response at operation 916, delivering the processed query results to the user through the entity-based architecture.

Figure 10:
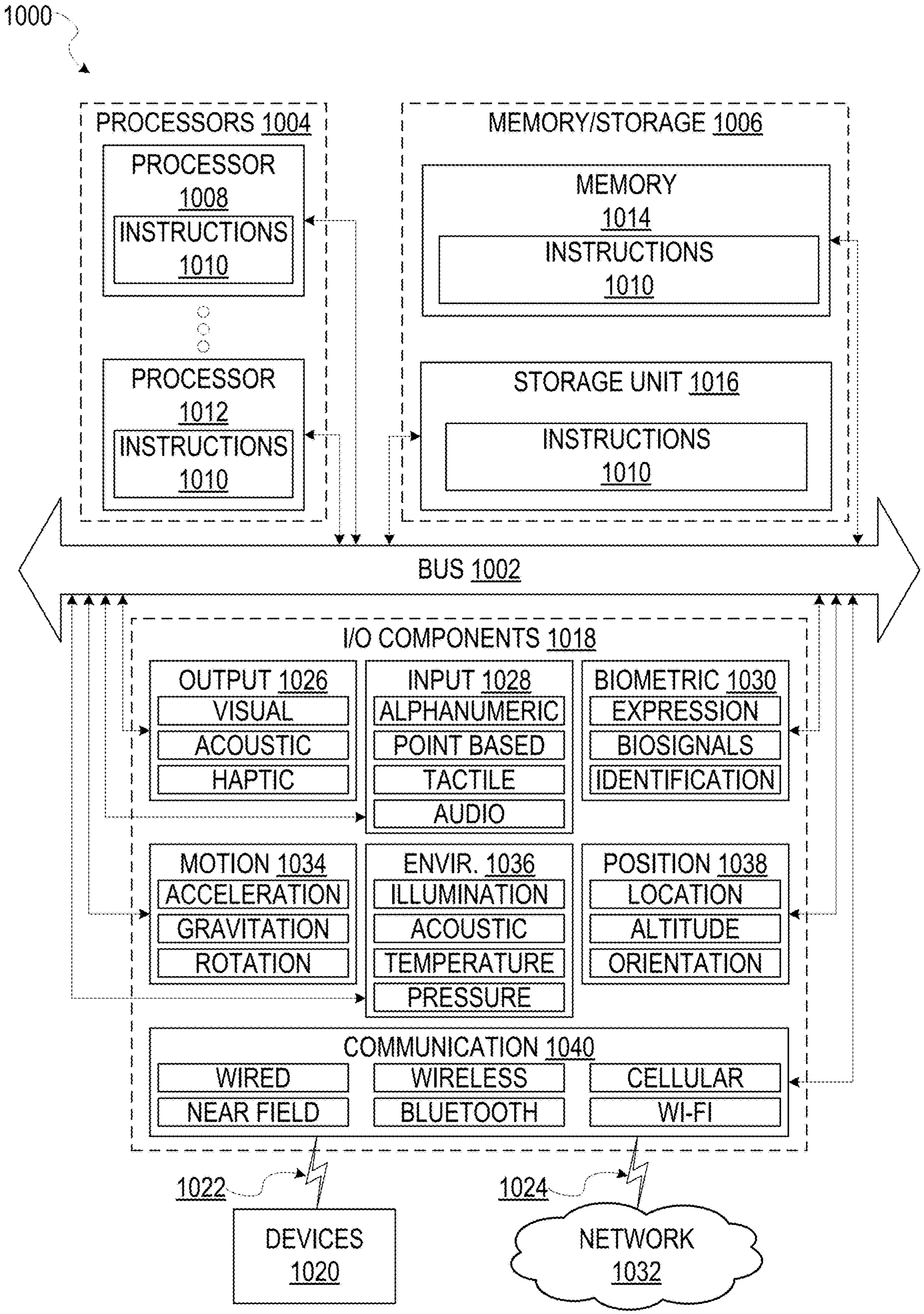
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform the methodologies for road condition monitoring discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform road network condition detection and analysis may be executed. The instructions 1010 transform the general, non-programmed machine 1000 into a particular machine 1000 programmed to collect sensor data from vehicles, generate spatiotemporal indices, analyze road conditions, and generate map overlays. In a networked deployment, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 1010, sequentially or otherwise, that specify actions to be taken by machine 1000.

The machine 1000 includes processors 1004 that execute instructions for the road condition monitoring system, including data collection, data processing, analysis and presentation modules. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 include components configured to receive sensor data from vehicle-mounted devices and provide map overlay outputs. The specific I/O components 1018 that are included in a particular machine 1000 will depend on the type of machine. For example, portable machines such as mobile phones will likely include a touch input device or other such input mechanisms, while a headless server machine will likely not include such a touch input device. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 are configured to receive dash camera image data and accelerometer data from vehicles.

The I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 include GPS receivers for tracking vehicle locations associated with the sensor data.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)). The communication components support transmission of sensor data, spatiotemporal indices, and map overlays between system components.

The communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth. The components facilitate data collection from the distributed vehicle sensor network, enabling the system to maintain current road condition information across geographic areas. The components support transmission of live road condition data, incident reports, and other detected conditions to provide situational awareness for routing and operations.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

What is claimed is:

1. A method comprising:

maintaining a plurality of entities in an entity registry, each entity of the plurality of entities corresponding to a data type and comprising entity information that includes query fragments and entity attributes, each query fragment for each entity defining how to access and retrieve data for the data type of the entity;

receiving a natural language query from a client device;

analyzing the natural language query to identify multiple entities referenced in the query;

retrieving entity information associated with the multiple entities from the entity registry, the retrieved entity information comprising query fragments of the multiple entities and excludes entity information associated with entities not identified in the natural language query;

constructing a data retrieval operation by combining the query fragments of the multiple entities;

executing the data retrieval operation against one or more data sources to obtain result data using the combined query fragments;

determining a timestamp that indicates when data associated with at least one of the multiple entities was last updated;

providing the result data and the entity attributes of the multiple entities, including the timestamp, to a natural language processing system; and receiving, from the natural language processing system, a response to the natural language query, the response including an indication of data recency based on the timestamp.

2. The method of claim 1, wherein the entity attributes comprise at least one of:

retriever functions that define how to fetch data for the entity through one or more data access protocols;

GraphQL query fragments for constructing data queries;

data schema definitions describing the structure of entity data;

field mappings that correlate entity fields with database columns;

data transformation rules for processing retrieved data;

filter specifications that define valid filtering operations for the entity;

aggregation functions for summarizing entity data;

join conditions specifying how the entity relates to other entities; and entity relationship definitions specifying hierarchical connections to other entities.

3. The method of claim 1, wherein the plurality of entities are organized in a hierarchical structure, and wherein retrieving entity information comprises retrieving information from a branch of entities in the hierarchical structure.

4. The method of claim 1, further comprising:

analyzing the result data using the natural language processing system;

determining, based on the analysis, that additional data is needed to respond to the natural language query;

identifying additional data entities to query; and retrieving additional result data based on the additional data entities.

5. The method of claim 1, wherein constructing the data retrieval operation comprises:

ranking the query fragments to execute a highest-ranking query fragment first.

6. The method of claim 1, further comprising:

receiving a request to add a new entity to the entity registry;

generating entity information for the new entity, including the query fragments and the entity attributes specific to the new entity; and storing the new entity in the entity registry.

7. The method of claim 1, wherein the identifying the multiple entities comprises:

determining a current application context; and activating the multiple entities based on the current application context, wherein the application context includes at least one of:

a current page or dashboard;

a chat history; or user profile information.

8. The method of claim 1, wherein the analyzing the natural language query comprises using one or more of:

keyword extraction;

parts-of-speech analysis;

entity extraction models; or machine learning models.

9. A system comprising:

a memory; and at least one hardware processor to perform operations comprising:

maintaining a plurality of entities in an entity registry, each entity of the plurality of entities corresponding to a data type and comprising entity information that includes query fragments and entity attributes, each query fragment for each entity defining how to access and retrieve data for the data type of the entity;

receiving a natural language query from a client device;

analyzing the natural language query to identify multiple entities referenced in the query;

retrieving entity information associated with the multiple entities from the entity registry, the retrieved entity information comprising query fragments of the multiple entities and excludes entity information associated with entities not identified in the natural language query;

constructing a data retrieval operation by combining the query fragments of the multiple entities;

executing the data retrieval operation against one or more data sources to obtain result data using the combined query fragments;

determining a timestamp that indicates when data associated with at least one of the multiple entities was last updated;

providing the result data and the entity attributes of the multiple entities, including the timestamp, to a natural language processing system; and receiving, from the natural language processing system, a response to the natural language query, the response including an indication of data recency based on the timestamp.

10. The system of claim 9, wherein the entity attributes comprise at least one of:

retriever functions that define how to fetch data for the entity;

GraphQL query fragments for constructing data queries;

data schema definitions describing the structure of entity data;

field mappings that correlate entity fields with database columns;

data transformation rules for processing retrieved data;

filter specifications that define valid filtering operations for the entity;

aggregation functions for summarizing entity data;

join conditions specifying how the entity relates to other entities; and entity relationship definitions specifying hierarchical connections to other entities.

11. The system of claim 9, wherein the plurality of entities are organized in a hierarchical structure, and wherein retrieving entity information comprises retrieving information from a branch of entities in the hierarchical structure.

12. The system of claim 9, further comprising:

analyzing the result data using the natura language processing system;

determining, based on the analysis, that additional data is needed to respond to the natural language query;

identifying additional data entities to query; and retrieving additional result data based on the additional data entities.

13. The system of claim 9, wherein constructing the data retrieval operation comprises:

ranking the query fragments to execute a highest-ranking query fragment first.

14. The system of claim 9, further comprising:

receiving a request to add a new entity to the entity registry;

generating entity information for the new entity, including the query fragments and the entity attributes specific to the new entity; and storing the new entity in the entity registry.

15. A non-transitory machine-readable storage medium comprising instructions that, when executed by one or more processors of a machine, cause the machine to perform operations comprising:

maintaining a plurality of entities in an entity registry, each entity of the plurality of entities corresponding to a data type and comprising entity information that includes query fragments and entity attributes, each query fragment for each entity defining how to access and retrieve data for the data type of the entity;

receiving a natural language query from a client device;

analyzing the natural language query to identify multiple entities referenced in the query;

retrieving entity information associated with the multiple entities from the entity registry, the retrieved entity information comprising query fragments of the multiple entities and excludes entity information associated with entities not identified in the natural language query;

constructing a data retrieval operation by combining the query fragments of the multiple entities;

executing the data retrieval operation against one or more data sources to obtain result data using the combined query fragments;

determining a timestamp that indicates when data associated with at least one of the multiple entities was last updated;

providing the result data and the entity attributes of the multiple entities, including the timestamp, to a natural language processing system; and receiving, from the natural language processing system, a response to the natural language query, the response including an indication of data recency based on the timestamp.

16. The non-transitory machine-readable storage medium of claim 15, wherein the entity attributes comprise at least one of:

retriever functions that define how to fetch data for the entity;

GraphQL query fragments for constructing data queries;

data schema definitions describing the structure of entity data;

field mappings that correlate entity fields with database columns;

data transformation rules for processing retrieved data;

filter specifications that define valid filtering operations for the entity;

aggregation functions for summarizing entity data;

join conditions specifying how the entity relates to other entities; and entity relationship definitions specifying hierarchical connections to other entities.

17. The non-transitory machine-readable storage medium of claim 15, wherein the data entities are organized in a hierarchical structure, and wherein retrieving entity information comprises retrieving information from a branch of entities in the hierarchical structure.

18. The non-transitory machine-readable storage medium of claim 15, further comprising:

analyzing the result data using the natural language processing system;

determining, based on the analysis, that additional data is needed to respond to the natural language query;

identifying additional data entities to query; and retrieving additional result data based on the additional data entities.

* * * * *